United States Patent
Mullen et al.

(10) Patent No.: US 11,120,427 B2
(45) Date of Patent: Sep. 14, 2021

(54) SYSTEMS AND METHODS FOR CARDS AND DEVICES OPERABLE TO COMMUNICATE VIA LIGHT PULSING

(75) Inventors: Jeffrey D. Mullen, Pittsburgh, PA (US); David J. Hartwick, Aliquippa, PA (US); Christopher J. Rigatti, Pittsburgh, PA (US); Philip W. Yen, Cupertino, CA (US)

(73) Assignee: DYNAMICS INC., Pittsburgh, PA (US)

( * ) Notice: Subject to any disclaimer, the term of this patent is extended or adjusted under 35 U.S.C. 154(b) by 0 days.

(21) Appl. No.: 13/110,553

(22) Filed: May 18, 2011

(65) Prior Publication Data

US 2011/0284640 A1 Nov. 24, 2011

Related U.S. Application Data

(60) Provisional application No. 61/345,649, filed on May 18, 2010, provisional application No. 61/345,659, filed on May 18, 2010.

(51) Int. Cl.
*G06Q 20/34* (2012.01)
*G06F 3/041* (2006.01)
*G06F 3/044* (2006.01)
*G07F 7/08* (2006.01)

(52) U.S. Cl.
CPC .......... *G06Q 20/352* (2013.01); *G06F 3/044* (2013.01); *G06F 3/0416* (2013.01); *G07F 7/088* (2013.01); *G07F 7/0833* (2013.01); *G07F 7/0853* (2013.01)

(58) Field of Classification Search
CPC .. G06Q 20/34; G06Q 20/341; G06Q 20/3415; G06Q 20/352; G07F 7/0806; G07F 7/0833; G07F 7/084

USPC ................................ 235/375, 379–382, 492
See application file for complete search history.

(56) References Cited

U.S. PATENT DOCUMENTS

| | | | |
|---|---|---|---|
| 4,027,267 A | * | 5/1977 | Larsen ............... G11B 20/1419 341/50 |
| 4,353,064 A | | 10/1982 | Stamm |
| 4,394,654 A | | 7/1983 | Hofmann-Cerfontaine |
| 4,614,861 A | | 9/1986 | Pavlov et al. |
| 4,667,087 A | | 5/1987 | Quintana |

(Continued)

FOREIGN PATENT DOCUMENTS

| | | |
|---|---|---|
| JP | 05210770 A | 8/1993 |
| WO | WO9852735 | 11/1998 |

(Continued)

OTHER PUBLICATIONS

U.S. Appl. No. 60/594,300, Poidomani et al.

(Continued)

*Primary Examiner* — Thien M Le
*Assistant Examiner* — April A Taylor

(57) ABSTRACT

A card is provided with a light sensor operable to receive information via light emitted from a display screen or another source of light. Accordingly, a mobile telephonic device or portable computer (e.g., tablet computer) may communicate information to a card via light pulses. Information communicated via light may include, for example, points balances, credit balances, debit balances, transaction history, software updates, coupons, promotions, advertisements or any other type of information.

20 Claims, 10 Drawing Sheets

(56) References Cited

U.S. PATENT DOCUMENTS

| | | | |
|---|---|---|---|
| 4,701,601 A | 10/1987 | Francini et al. | |
| 4,720,860 A | 1/1988 | Weiss | |
| 4,786,791 A | 11/1988 | Hodama | |
| 4,791,283 A | 12/1988 | Burkhardt | |
| 4,797,542 A | 1/1989 | Hara | |
| 5,038,251 A | 8/1991 | Sugiyama et al. | |
| 5,168,520 A | 12/1992 | Weiss | |
| 5,237,614 A | 8/1993 | Weiss | |
| 5,276,311 A | 1/1994 | Hennige | |
| 5,291,068 A | 3/1994 | Rammel et al. | |
| 5,347,580 A | 9/1994 | Molva et al. | |
| 5,361,062 A | 11/1994 | Weiss et al. | |
| 5,412,199 A | 5/1995 | Finkelstein et al. | |
| 5,416,280 A | 5/1995 | McDermott et al. | |
| 5,434,398 A | 7/1995 | Goldberg | |
| 5,434,405 A | 7/1995 | Finkelstein et al. | |
| 5,478,994 A | 12/1995 | Rahman | |
| 5,479,512 A | 12/1995 | Weiss | |
| 5,484,997 A | 1/1996 | Haynes | |
| 5,485,519 A | 1/1996 | Weiss | |
| 5,585,787 A | 12/1996 | Wallerstein | |
| 5,591,949 A | 1/1997 | Bernstein | |
| 5,608,203 A | 3/1997 | Finkelstein et al. | |
| 5,623,552 A | 4/1997 | Lane | |
| 5,657,388 A | 8/1997 | Weiss | |
| 5,834,747 A | 11/1998 | Cooper | |
| 5,834,756 A | 11/1998 | Gutman et al. | |
| 5,856,661 A | 1/1999 | Finkelstein et al. | |
| 5,864,623 A | 1/1999 | Messina et al. | |
| 5,907,142 A | 5/1999 | Kelsey | |
| 5,907,350 A * | 5/1999 | Nemirofsky | 725/23 |
| 5,913,203 A | 6/1999 | Wong et al. | |
| 5,937,394 A | 8/1999 | Wong et al. | |
| 5,955,021 A | 9/1999 | Tiffany, III | |
| 5,956,699 A | 9/1999 | Wong et al. | |
| 6,005,691 A * | 12/1999 | Grot et al. | 359/2 |
| 6,025,054 A | 2/2000 | Tiffany, III | |
| 6,045,043 A | 4/2000 | Bashan et al. | |
| 6,076,163 A | 6/2000 | Hoffstein et al. | |
| 6,085,320 A | 7/2000 | Kaliski | |
| 6,095,416 A | 8/2000 | Grant et al. | |
| 6,118,205 A | 9/2000 | Wood et al. | |
| 6,130,621 A | 10/2000 | Weiss | |
| 6,145,079 A | 11/2000 | Mitty et al. | |
| 6,157,920 A | 12/2000 | Jakobsson et al. | |
| 6,161,181 A | 12/2000 | Haynes, III et al. | |
| 6,163,313 A | 12/2000 | Aroyan et al. | |
| 6,176,430 B1 | 1/2001 | Finkelstein et al. | |
| 6,182,894 B1 | 2/2001 | Hackett et al. | |
| 6,189,098 B1 | 2/2001 | Kaliski | |
| 6,199,052 B1 | 3/2001 | Mitty et al. | |
| 6,206,293 B1 | 3/2001 | Gutman et al. | |
| 6,240,184 B1 | 5/2001 | Huynh et al. | |
| 6,241,153 B1 | 6/2001 | Tiffany, III | |
| 6,256,873 B1 | 7/2001 | Tiffany, III | |
| 6,269,163 B1 | 7/2001 | Rivest et al. | |
| 6,286,022 B1 | 9/2001 | Kaliski et al. | |
| 6,308,890 B1 | 10/2001 | Cooper | |
| 6,313,724 B1 | 11/2001 | Osterweil | |
| 6,389,442 B1 | 5/2002 | Yin et al. | |
| 6,393,447 B1 | 5/2002 | Jakobsson et al. | |
| 6,411,715 B1 | 6/2002 | Liskov et al. | |
| 6,431,439 B1 | 8/2002 | Suer et al. | |
| 6,446,052 B1 | 9/2002 | Juels | |
| 6,460,141 B1 | 10/2002 | Olden | |
| 6,592,044 B1 | 7/2003 | Wong et al. | |
| 6,607,127 B2 | 8/2003 | Wong | |
| 6,609,654 B1 | 8/2003 | Anderson et al. | |
| 6,631,849 B2 | 10/2003 | Blossom | |
| 6,655,585 B2 | 12/2003 | Shinn | |
| 6,681,988 B2 | 1/2004 | Stack et al. | |
| 6,705,520 B1 | 3/2004 | Pitroda et al. | |
| 6,755,341 B1 | 6/2004 | Wong et al. | |
| 6,764,005 B2 | 7/2004 | Cooper | |
| 6,769,618 B1 | 8/2004 | Finkelstein | |
| 6,805,288 B2 | 10/2004 | Routhenstein et al. | |
| 6,811,082 B2 | 11/2004 | Wong | |
| 6,813,354 B1 | 11/2004 | Jakobsson et al. | |
| 6,817,532 B2 | 11/2004 | Finkelstein | |
| 6,820,804 B2 | 11/2004 | Segal et al. | |
| 6,873,974 B1 | 3/2005 | Schutzer | |
| 6,902,116 B2 | 6/2005 | Finkelstein | |
| 6,970,070 B2 | 11/2005 | Juels et al. | |
| 6,980,969 B1 | 12/2005 | Tuchler et al. | |
| 6,985,583 B1 | 1/2006 | Brainard et al. | |
| 6,991,155 B2 | 1/2006 | Burchette, Jr. | |
| 7,013,030 B2 | 3/2006 | Wong et al. | |
| 7,035,443 B2 | 4/2006 | Wong | |
| 7,039,223 B2 | 5/2006 | Wong | |
| 7,044,394 B2 | 5/2006 | Brown | |
| 7,051,929 B2 | 5/2006 | Li | |
| 7,083,094 B2 | 8/2006 | Cooper | |
| 7,100,049 B2 | 8/2006 | Gasparini et al. | |
| 7,100,821 B2 | 9/2006 | Rasti | |
| 7,111,172 B1 | 9/2006 | Duane et al. | |
| 7,114,652 B2 | 10/2006 | Moullette et al. | |
| 7,136,514 B1 | 11/2006 | Wong | |
| 7,140,550 B2 | 11/2006 | Ramachandran | |
| 7,163,153 B2 | 1/2007 | Blossom | |
| 7,195,154 B2 | 3/2007 | Routhenstein | |
| 7,197,639 B1 | 3/2007 | Juels et al. | |
| 7,219,368 B2 | 5/2007 | Juels et al. | |
| 7,225,537 B2 | 6/2007 | Reed | |
| 7,225,994 B2 | 6/2007 | Finkelstein | |
| 7,246,752 B2 | 7/2007 | Brown | |
| 7,298,243 B2 | 11/2007 | Juels et al. | |
| 7,306,144 B2 | 12/2007 | Moore | |
| 7,334,732 B2 | 2/2008 | Cooper | |
| 7,337,326 B2 | 2/2008 | Palmer et al. | |
| 7,346,775 B2 | 3/2008 | Gasparini et al. | |
| 7,356,696 B1 | 4/2008 | Jakobsson et al. | |
| 7,357,319 B1 | 4/2008 | Lin et al. | |
| 7,359,507 B2 | 4/2008 | Kaliski | |
| 7,360,688 B1 | 4/2008 | Harris | |
| 7,363,494 B2 | 4/2008 | Brainard et al. | |
| 7,380,710 B2 | 6/2008 | Brown | |
| 7,398,253 B1 | 7/2008 | Pinnell | |
| 7,404,087 B2 | 7/2008 | Teunen | |
| 7,424,570 B2 | 9/2008 | D'Albore et al. | |
| 7,427,033 B1 | 9/2008 | Roskind | |
| 7,454,349 B2 | 11/2008 | Teunen et al. | |
| 7,461,250 B1 | 12/2008 | Duane et al. | |
| 7,461,399 B2 | 12/2008 | Juels et al. | |
| 7,472,093 B2 | 12/2008 | Juels | |
| 7,472,829 B2 | 1/2009 | Brown | |
| 7,494,055 B2 | 2/2009 | Fernandes et al. | |
| 7,502,467 B2 | 3/2009 | Brainard et al. | |
| 7,502,933 B2 | 3/2009 | Jakobsson et al. | |
| 7,503,485 B1 | 3/2009 | Routhenstein | |
| 7,516,492 B1 | 4/2009 | Nisbet et al. | |
| 7,523,301 B2 | 4/2009 | Nisbet et al. | |
| 7,530,495 B2 | 5/2009 | Cooper | |
| 7,532,104 B2 | 5/2009 | Juels | |
| 7,543,739 B2 | 6/2009 | Brown et al. | |
| 7,559,464 B2 | 7/2009 | Routhenstein | |
| 7,562,221 B2 | 7/2009 | Nystrom et al. | |
| 7,562,222 B2 | 7/2009 | Gasparini et al. | |
| 7,580,898 B2 | 8/2009 | Brown et al. | |
| 7,584,153 B2 | 9/2009 | Brown et al. | |
| 7,591,426 B2 | 9/2009 | Osterweil et al. | |
| 7,591,427 B2 | 9/2009 | Osterweil | |
| 7,602,904 B2 | 10/2009 | Juels et al. | |
| 7,627,879 B2 * | 12/2009 | Koplar | G06Q 10/02 725/136 |
| 7,631,804 B2 | 12/2009 | Brown | |
| 7,639,537 B2 | 12/2009 | Sepe et al. | |
| 7,641,124 B2 | 1/2010 | Brown et al. | |
| 7,660,902 B2 | 2/2010 | Graham et al. | |
| 7,828,207 B2 | 11/2010 | Cooper | |
| 8,000,979 B2 | 8/2011 | Blom | |
| 8,100,333 B2 * | 1/2012 | Reynolds et al. | 235/487 |
| 8,931,703 B1 | 1/2015 | Mullen et al. | |
| 9,547,816 B2 | 1/2017 | Mullen et al. | |
| 9,875,437 B2 | 1/2018 | Cloutier et al. | |

(56) References Cited

U.S. PATENT DOCUMENTS

| | | | |
|---|---|---|---|
| 10,095,974 B1* | 10/2018 | Mullen | G06K 19/07769 |
| 10,198,687 B2 | 2/2019 | Mullen et al. | |
| 10,223,631 B2 | 3/2019 | Mullen et al. | |
| 10,255,545 B2 | 4/2019 | Mullen et al. | |
| 10,325,199 B2 | 6/2019 | Mullen et al. | |
| 10,430,704 B2 | 10/2019 | Mullen et al. | |
| 10,467,521 B2 | 11/2019 | Mullen et al. | |
| 10,482,363 B1 | 11/2019 | Cloutier et al. | |
| 10,496,918 B2 | 12/2019 | Mullen et al. | |
| 10,504,105 B2 | 12/2019 | Mullen et al. | |
| 10,579,920 B2 | 3/2020 | Mullen et al. | |
| 10,693,263 B1 | 6/2020 | Mullen et al. | |
| 10,948,964 B1 | 3/2021 | Cloutier | |
| 2001/0034702 A1 | 10/2001 | Mockett et al. | |
| 2001/0047335 A1 | 11/2001 | Arndt et al. | |
| 2002/0050983 A1 | 5/2002 | Liu et al. | |
| 2002/0059114 A1 | 5/2002 | Cockrill et al. | |
| 2002/0082989 A1 | 6/2002 | Fife et al. | |
| 2002/0096570 A1 | 7/2002 | Wong et al. | |
| 2002/0120583 A1 | 8/2002 | Keresman, III et al. | |
| 2003/0034388 A1 | 2/2003 | Routhenstein et al. | |
| 2003/0052168 A1 | 3/2003 | Wong | |
| 2003/0057278 A1 | 3/2003 | Wong | |
| 2003/0116635 A1 | 6/2003 | Taban | |
| 2003/0152253 A1 | 8/2003 | Wong | |
| 2003/0163287 A1 | 8/2003 | Vock et al. | |
| 2003/0173409 A1 | 9/2003 | Vogt et al. | |
| 2003/0179909 A1 | 9/2003 | Wong et al. | |
| 2003/0179910 A1 | 9/2003 | Wong | |
| 2003/0226899 A1 | 12/2003 | Finkelstein | |
| 2004/0035942 A1 | 2/2004 | Silverman | |
| 2004/0133787 A1 | 7/2004 | Doughty | |
| 2004/0162732 A1 | 8/2004 | Rahim et al. | |
| 2004/0172535 A1 | 9/2004 | Jakobsson | |
| 2004/0177045 A1 | 9/2004 | Brown | |
| 2005/0033688 A1 | 2/2005 | Peart | |
| 2005/0043997 A1 | 2/2005 | Sohata et al. | |
| 2005/0080747 A1 | 4/2005 | Anderson et al. | |
| 2005/0086160 A1 | 4/2005 | Wong et al. | |
| 2005/0086177 A1 | 4/2005 | Anderson et al. | |
| 2005/0116026 A1 | 6/2005 | Burger et al. | |
| 2005/0119940 A1 | 6/2005 | Concilio et al. | |
| 2005/0154643 A1 | 7/2005 | Doan et al. | |
| 2005/0228959 A1 | 10/2005 | D'Albore et al. | |
| 2006/0000900 A1 | 1/2006 | Fernandes et al. | |
| 2006/0037073 A1 | 2/2006 | Juels et al. | |
| 2006/0041759 A1 | 2/2006 | Kaliski et al. | |
| 2006/0085328 A1 | 4/2006 | Cohen et al. | |
| 2006/0091223 A1 | 5/2006 | Zellner | |
| 2006/0161435 A1 | 7/2006 | Atef et al. | |
| 2006/0163353 A1 | 7/2006 | Moulette et al. | |
| 2006/0174104 A1 | 8/2006 | Crichton et al. | |
| 2006/0196931 A1 | 9/2006 | Holtmanns et al. | |
| 2006/0256961 A1 | 11/2006 | Brainard et al. | |
| 2006/0289632 A1 | 12/2006 | Walker et al. | |
| 2007/0034700 A1 | 2/2007 | Poidomani et al. | |
| 2007/0040683 A1* | 2/2007 | Oliver et al. | 340/572.1 |
| 2007/0114274 A1 | 5/2007 | Gibbs et al. | |
| 2007/0124321 A1 | 5/2007 | Szydlo | |
| 2007/0152070 A1 | 7/2007 | D'Albore | |
| 2007/0152072 A1 | 7/2007 | Frallicciardi et al. | |
| 2007/0153487 A1 | 7/2007 | Frallicciardi et al. | |
| 2007/0174614 A1 | 7/2007 | Duane et al. | |
| 2007/0241183 A1 | 10/2007 | Brown et al. | |
| 2007/0241201 A1 | 10/2007 | Brown et al. | |
| 2007/0256123 A1 | 11/2007 | Duane et al. | |
| 2007/0192249 A1 | 12/2007 | Biffle et al. | |
| 2007/0291753 A1 | 12/2007 | Romano | |
| 2008/0005510 A1 | 1/2008 | Sepe et al. | |
| 2008/0008315 A1 | 1/2008 | Fontana et al. | |
| 2008/0008322 A1 | 1/2008 | Fontana et al. | |
| 2008/0010675 A1 | 1/2008 | Massascusa et al. | |
| 2008/0016351 A1 | 1/2008 | Fontana et al. | |
| 2008/0019507 A1 | 1/2008 | Fontana et al. | |
| 2008/0028447 A1 | 1/2008 | O'Malley et al. | |
| 2008/0040271 A1 | 2/2008 | Hammad et al. | |
| 2008/0040276 A1 | 2/2008 | Hammad et al. | |
| 2008/0058016 A1 | 3/2008 | Di Maggio et al. | |
| 2008/0059379 A1 | 3/2008 | Ramaci et al. | |
| 2008/0096326 A1 | 4/2008 | Reed | |
| 2008/0126398 A1 | 5/2008 | Cimino | |
| 2008/0128515 A1 | 6/2008 | Di Iorio | |
| 2008/0148394 A1 | 6/2008 | Poidomani et al. | |
| 2008/0201264 A1 | 8/2008 | Brown et al. | |
| 2008/0209550 A1 | 8/2008 | Di Iorio | |
| 2008/0288699 A1 | 11/2008 | Chichierchia | |
| 2008/0294930 A1 | 11/2008 | Varone et al. | |
| 2008/0302877 A1 | 12/2008 | Musella et al. | |
| 2009/0013122 A1 | 1/2009 | Sepe et al. | |
| 2009/0036147 A1 | 2/2009 | Romano | |
| 2009/0039149 A1* | 2/2009 | Top | 235/375 |
| 2009/0046522 A1 | 2/2009 | Sepe et al. | |
| 2009/0108064 A1 | 4/2009 | Fernandes et al. | |
| 2009/0150295 A1 | 6/2009 | Hatch et al. | |
| 2009/0152365 A1 | 6/2009 | Li et al. | |
| 2009/0159673 A1* | 6/2009 | Mullen et al. | 235/380 |
| 2009/0159698 A1* | 6/2009 | Mullen et al. | 235/493 |
| 2009/0242648 A1 | 10/2009 | Di Sirio et al. | |
| 2009/0244858 A1 | 10/2009 | Di Sirio et al. | |
| 2009/0253460 A1 | 10/2009 | Varone et al. | |
| 2009/0255996 A1 | 10/2009 | Brown et al. | |
| 2009/0273442 A1* | 11/2009 | Ozolins | G06F 21/32 340/5.82 |
| 2009/0290704 A1 | 11/2009 | Cimino | |
| 2009/0303885 A1 | 12/2009 | Longo | |
| 2010/0066701 A1 | 3/2010 | Ningrat | |
| 2010/0108771 A1 | 5/2010 | Wong et al. | |
| 2011/0028184 A1 | 2/2011 | Cooper | |
| 2011/0298721 A1 | 12/2011 | Eldridge | |
| 2017/0286817 A1 | 10/2017 | Mullen et al. | |
| 2019/0042903 A1 | 2/2019 | Cloutier et al. | |
| 2019/0065928 A1 | 2/2019 | Mullen et al. | |
| 2019/0197387 A1 | 6/2019 | Mullen et al. | |
| 2019/0340484 A1 | 11/2019 | Mullen et al. | |

FOREIGN PATENT DOCUMENTS

| | | |
|---|---|---|
| WO | WO0247019 | 6/2002 |
| WO | WO06066322 | 6/2006 |
| WO | WO06080929 | 8/2006 |
| WO | WO06105092 | 10/2006 |
| WO | WO06116772 | 11/2006 |
| WO | WO08064403 | 6/2008 |

OTHER PUBLICATIONS

U.S. Appl. No. 60/675,388, Poidomani et al.
The Bank Credit Card Business. Second Edition, American Bankers Association, Washington, D.C., 1996.
A Day in the Life of a Flux Reversal. http://www.phrack.org/issues.html?issue=37&id=6#article. As viewed on Apr. 12, 2010.
Dynamic Virtual Credit Card Numbers. http://homes.cerias.purdue.edu/~jtli/paper/fc07.pdf.
English translation of JP 05210770 A.
USPTO, International Search Report, dated Sep. 9, 2011.

* cited by examiner

SYSTEMS AND METHODS FOR CARDS AND DEVICES OPERABLE TO COMMUNICATE VIA LIGHT PULSING

CROSS-REFERENCE TO RELATED APPLICATION

This application claims the benefit of U.S. Provisional Patent Application No. 61/345,649, titled "SYSTEMS AND METHODS FOR CARDS AND DEVICES OPERABLE TO COMMUNICATE TO TOUCH SENSITIVE DISPLAYS," filed May 18, 2010 and U.S. Provisional Patent Application No. 61/345,659, titled "SYSTEMS AND METHODS FOR CARDS AND DEVICES OPERABLE TO COMMUNICATE VIA LIGHT PULSING," filed May 18, 2010, all of which are hereby incorporated by reference herein in their entirety.

BACKGROUND OF THE INVENTION

This invention relates to magnetic cards and devices and associated payment systems.

SUMMARY OF THE INVENTION

A card may include a dynamic magnetic communications device. Such a dynamic magnetic communications device may take the form of a magnetic encoder or a magnetic emulator. A magnetic encoder may change the information located on a magnetic medium such that a magnetic stripe reader may read changed magnetic information from the magnetic medium. A magnetic emulator may generate electromagnetic fields that directly communicate data to a magnetic stripe reader. Such a magnetic emulator may communicate data serially to a read-head of the magnetic stripe reader.

All, or substantially all, of the front as well as the back of a card may be a display (e.g., bi-stable, non bi-stable, LCD, LED, or electrochromic display). Electrodes of a display may be coupled to one or more capacitive touch sensors such that a display may be provided as a touch-screen display. Any type of touch-screen display may be utilized. Such touch-screen displays may be operable of determining multiple points of touch. Accordingly, a barcode may be displayed across all, or substantially all, of a surface of a card. In doing so, computer vision equipment such as barcode readers may be less susceptible to errors in reading a displayed barcode.

A card may include a number of output devices to output dynamic information. For example, a card may include one or more RFIDs or IC chips to communicate to one or more RFID readers or IC chip readers, respectively. A card may include devices to receive information. For example, an RFID and IC chip may both receive information and communicate information to an RFID and IC chip reader, respectively. A device for receiving wireless information signals may be provided. A light sensing device or sound sensing device may be utilized to receive information wirelessly. A card may include a central processor that communicates data through one or more output devices simultaneously (e.g., an RFID, IC chip, and a dynamic magnetic stripe communications device). The central processor may receive information from one or more input devices simultaneously (e.g., an RFID, IC chip, dynamic magnetic stripe devices, light sensing device, and a sound sensing device). A processor may be coupled to surface contacts such that the processor may perform the processing capabilities of, for example, an EMV chip. The processor may be laminated over and not exposed such that the processor is not exposed on the surface of the card.

A card may be provided with a button in which the activation of the button causes a code to be communicated through a dynamic magnetic stripe communications device (e.g., the subsequent time a read-head detector on the card detects a read-head). The code may be indicative of, for example, a feature (e.g., a payment feature). The code may be received by the card via manual input (e.g., onto buttons of the card) or via a wireless transmission (e.g., via light, electromagnetic communications, sound, or other wireless signals). A code may be communicated from a webpage (e.g., via light and/or sound) to a card. A card may include a display such that a received code may be visually displayed to a user. In doing so, the user may be provided with a way to select, and use, the code via both an in-store setting (e.g., via a magnetic stripe reader) or an online setting (e.g., by reading the code from a display and entering the code into a text box on a checkout page of an online purchase transaction). A remote server, such as a payment authorization server, may receive the code and may process a payment differently based on the code received. For example, a code may be a security code to authorize a purchase transaction. A code may provide a payment feature such that a purchase may be made with points, debit, credit, installment payments, or deferred payments via a single payment account number (e.g., a credit card number) to identify a user and a payment feature code to select the type of payment a user desires to utilize.

A dynamic magnetic stripe communications device may include a magnetic emulator that comprises an inductor (e.g., a coil). Current may be provided through this coil to create an electromagnetic field operable to communicate with the read-head of a magnetic stripe reader. The drive circuit may fluctuate the amount of current travelling through the coil such that a track of magnetic stripe data may be communicated to a read-head of a magnetic stripe reader. A switch (e.g., a transistor) may be provided to enable or disable the flow of current according to, for example, a frequency/double-frequency (F2F) encoding algorithm. In doing so, bits of data may be communicated.

A card may include a touch transmitter that may activate a capacitive touch sensor on another device such that the other device believes a user physically touched the capacitive touch sensor with his/her finger. Accordingly, a touch transmitter may activate a capacitive touch screen, such as a capacitive touch screen found on a mobile telephonic device, tablet computing device, or a capacitive touch screen of a laptop or stationary computer. The touch transmitter may, accordingly, communicate information to a device (e.g., to a mobile telephonic device) by activating and deactivating a touch sensor (or sensors) on a capacitive touch screen in a particular manner. For example, a touch transmitter may communicate information serially by activating and deactivating a capacitive touch screen sensor with respect to time. A touch transmitter may, accordingly, communicate information via a capacitive touch sensor using F2F encoding, where a state transition occurs either at an activation or, for example, at an activation as well as a deactivation. In this manner, a card may communicate information directly to a mobile telephonic device with a capacitive touch screen, or any device with a capacitive touch screen, without requiring any physical connections or the use of proprietary communication protocols.

A card, or other device, may have one or more light sensors. Such a light sensor may include, for example, one or more photoresistors, photodiodes, phototransistors, light emitting diodes sensitive to light, or any other device operable to discern light or convert light into electrical energy. Such light sensors may receive information via light. For example, one or more light sensors may receive light pulses and may discern such light pulses into information based on one or more information encoding schemes stored on memory of a device that includes the one or more light sensors.

Multiple light sensors may be provided. One or more light sensors may receive information from one region on a display that generates, for example, different pulses or patterns of light over time. Each light sensor may, for example, receive information from a different light region on a display. A light region may communicate light, for example, by transmitting different colors of light (e.g., red, blue, green) or communicating information by changing back and forth between two colors of light (e.g., black and white). Information may be communicated, for example, based on the transition between colors of light based on time. For example, a transition from one color to a different color may be determined as a transition by a device (e.g., a battery-powered payment card). A transition may be a change from a particular color (e.g., black) to another color (e.g., white). Alternatively, a transition may be a change from any color (e.g., black or white) to a different color (e.g., white or black, respectively). The duration of time between such transitions may be utilized to determine a particular bit of information. For example, a "short" period of time between transitions may be one bit (e.g., "0" or "1") while a "long" period of time between transitions may be a different bit (e.g., "1" or "0"). In doing so, for example, the same information may be communicated across displays having different frame rates using the same encoding scheme. A series of training pulses may be sent before and/or after a data message such that a processor receiving information from one or more light pulses may discern the difference between a "short" and a "long" period. For example, a number of bits (e.g., three, four, or five "0s" or "1s") may precede any data message and may be known as information the processor receives before a message. Such known bits may be, for example, a "short" period such that a processor may determine the approximate duration of a "short" period and utilize this to determine a "short" or "long" period between future transitions. Alternatively, for example, a processor may discern transition and timing information across a data message and determine, based on the received data, the transition periods that are "long" relative to the other periods. In doing so, the processor may discern data from the received transition information. A "long" transition period may be, for example, approximately twice as long as a "short" transition period. A "long" transition period may be, for example, at least 25 percent longer as a "short" transition period. More than two lengths of transition intervals may be utilized. For example, "short," "medium," "long," and "very long" transition intervals may be utilized to convey four states of information to a device.

Multiple regions of a display may be utilized to communicate information to a device (e.g., via a mobile telephonic device, portable computing device, or other device) via light. Each region may communicate different tracks of information. Tracks of information may also be communicated based on the state of each light region at a particular time. For example, if one region is a particular color during a particular period of time and another region is a different color during that same period of time then the particular combination of these states during a particular period may correlate to data information.

Multiple light sensors may allow for data to be communicated in parallel via multiple independent communication tracks (e.g., via multiple regions of a display providing light information to a device). For example, four light sensors may independently receive four data messages in parallel. Alternatively, for example, multiple light sensors may be utilized to receive a single message. Accordingly, multiple light sensors may be utilized to receive a single message faster than a single light sensor. For example, information may be communicated in more than two states (e.g., more than binary). For example, a first light sensor receiving white while a second light sensor receives black may be a "0." The first light sensor receiving white while the second light sensor receives white may be a "1." The first light sensor receiving black while the second light sensor receives white may be a "2." The first light sensor receiving black while the second light sensor receives black may be "3."

Multiple light sensors may be utilized in a sensor array to determine the same data from a single light region. Multiple samples may be taken from each sensor. Multiple samples from each sensor may be averaged together. The averaged samples from each sensor of a sample array may be utilized to determine information. For example, a majority or a supermajority of the sensors in an array may have to provide an average sample over a period of time indicative of a transition as occurring for a transition for a processor to determine that a transition has occurred. A sampling rate for a light sensor may be, for example, greater than 10 samples per second. For example, a processor may take a sample from a light sensor more than 20 times per second (e.g., more than 50 times per second).

A single light sensor may receive information serially in a variety of ways. For example, light may be communicated by providing different pulse widths of a particular color (e.g., white versus black). A standard black width may be utilized for synchronization. A white pulse the same width as the black may be a "0." A white pulse double the width of a black pulse may be "1." A white pulse triple the width of a black pulse may be "2." Accordingly, for example, such a scheme may allow information to be communicated by a display regardless of the frame rate. By comparing one duration of one type of light to another duration of another type of light, information may be communicated regardless of the frame rate.

A single light sensor may receive information serially, for example, via frequency double-frequency encoding. Particularly, for example, a processor may receive electrical signals from a light sensor indicative of the light sensed by a light sensor. Information may be pulsed to the processor, via the light sensor, by switching between black and white. The timing of transitions from white to black and black to white may be utilized to communicate information. A number of synchronization pulses may be communicated before a message such that the processor may lock onto the periodicity of a particular bit (e.g., "0" or "1"). A short duration between transitions may be a first bit of data (e.g., "0") while a long duration between transitions may be a second bit of data (e.g., "1"). Such a scheme may be independent of a frame rate of a display. Accordingly, for example, the information may be communicated via a display of a television set, a computer monitor, and a mobile cell phone—regardless if the frame rates are different for each device.

The card may receive information from a device having a capacitive touch screen such that bi-directional communications may occur with the device utilizing the capacitive touch screen. For example, a card may receive information via light pulses emitted from the capacitive touch display. More particularly, for example, a software program may be installed in a device (e.g., a mobile telephone or a tablet computing device) operable to emit messages, via light, to a card and receive messages, via touch, from the card. The bi-directional communication may happen in parallel (e.g., light pulses may be sent to the card simultaneously with touch pulses being received from the card). The bi-directional communications may happen sequentially (e.g., the card may communicate via touch and then, after the card communicates, the card may receive communication from the device via light and, after the device communicates, the card may communicate via touch).

Bi-directional communication may, for example, allow for handshaking to occur between the two devices such that each device may be identified and a secure communication channel may be setup via light pulses and touch pulses. Such a secure communication channel may have one or more (e.g., three) tracks of information. Additionally, for example, information indicative of a receipt of a message may be communicated via light and/or touch. Synchronization signals may be communicated before and after a message. For example, a string of particular bits (e.g., "0"s) may appear before every message in order for a card, or other device, to lock onto the timing of the information being transmitted in the signal. For example, a zero may be transmitted via a "short" touch pulse and a one may be transmitted via a "long" touch pulse. In synchronizing the signal, the receiving device may train itself onto the duration of a "short" touch pulse versus a "long" touch pulse. A "short" touch pulse may be the time between activations of a capacitive sensor or the time between the activation and deactivation of a touch sensor.

A card, or other device (e.g., a mobile telephonic device) may include one or more light sensors, touch transmitters, capacitive touch sensors, and light emitters. Accordingly, two instances of such a card may communicate bi-directionally via light as well as capacitive touch.

BRIEF DESCRIPTION OF THE DRAWINGS

The principles and advantages of the present invention can be more clearly understood from the following detailed description considered in conjunction with the following drawings, in which the same reference numerals denote the same structural elements throughout, and in which.

DETAILED DESCRIPTION OF THE INVENTION

Figure 1:
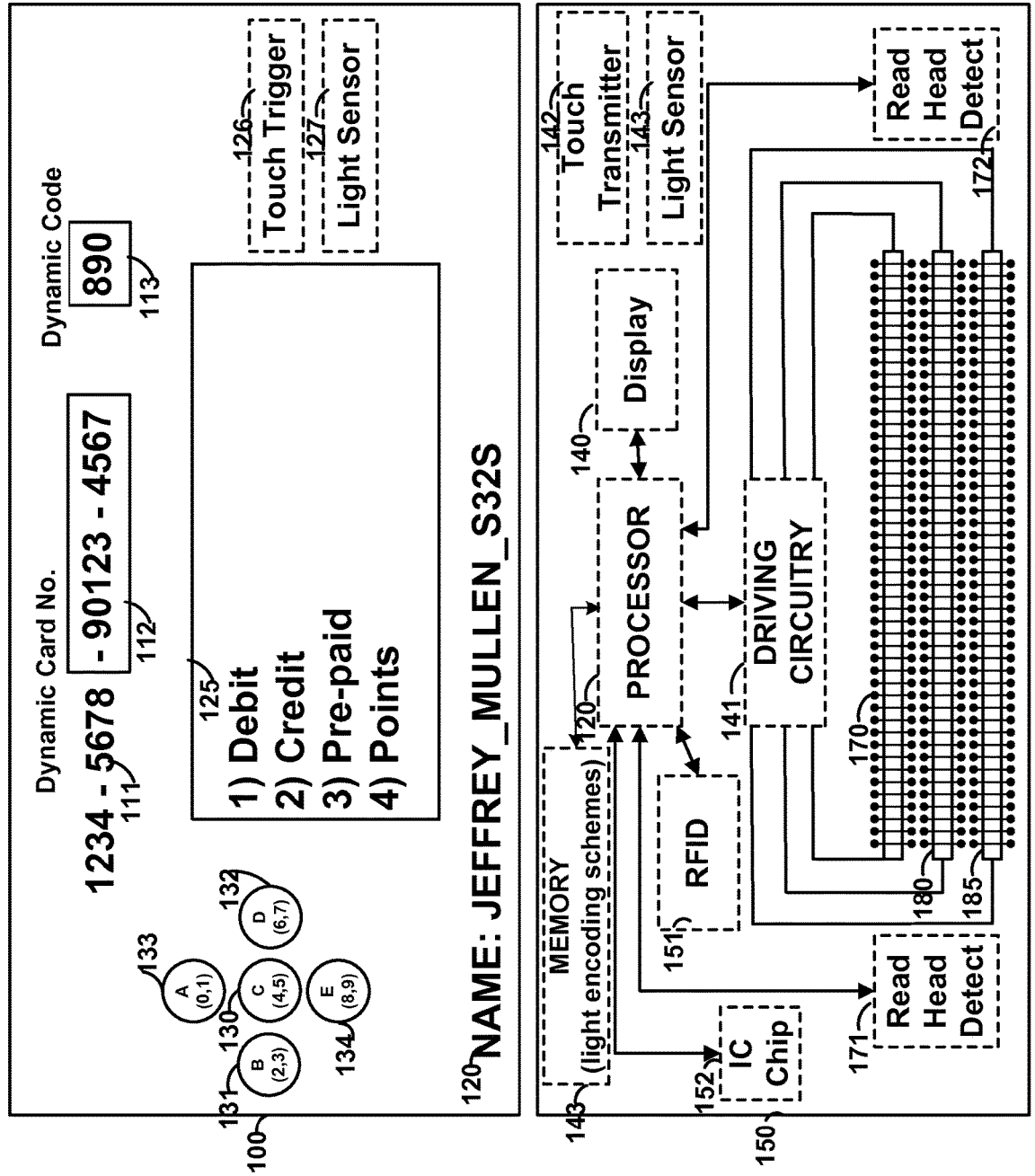
FIG. 1 is an illustration of cards constructed in accordance with the principles of the present invention.

FIG. 1 shows card 100 that may include, for example, a dynamic number that may be entirely, or partially, displayed via display 112. A dynamic number may include a permanent portion such as, for example, permanent portion 111. Permanent portion 111 may be printed as well as embossed or laser etched on card 100. Multiple displays may be provided on a card. For example, display 113 may be utilized to display a dynamic code such as a dynamic security code. Display 125 may also be provided to display logos, barcodes, as well as multiple lines of information. A display may be a bi-stable display or non bi-stable display. Permanent information 120 may also be included and may include information such as information specific to a user (e.g., a user's name or username) or information specific to a card (e.g., a card issue date and/or a card expiration date). Card 100 may include one or more buttons such as buttons 130-134. Such buttons may be mechanical buttons, capacitive buttons, or a combination or mechanical and capacitive buttons. A button (e.g., button 130) may be used, for example, to communicate information through a dynamic magnetic stripe communications device indicative of a user's desire to communicate a single track of magnetic stripe information. Persons skilled in the art will appreciate that pressing a button (e.g., button 130) may cause information to be communicated through a dynamic magnetic stripe communications device when an associated read-head detector detects the presence of a read-head of a magnetic stripe reader. Another button (e.g., button 131) may be utilized to communicate (e.g., after button 131 is pressed and after a read-head detects a read-head of a reader) information indicative of a user selection (e.g., to communicate two tracks of magnetic stripe data). Multiple buttons may be provided on a card and each button may be associated with different user selections.

Architecture 150 may be utilized with any card. Architecture 150 may include processor 120. Processor 120 may have on-board memory for storing information (e.g., drive code). Any number of components may communicate to processor 120 and/or may receive communications from processor 120. For example, one or more displays (e.g., display 140) may be coupled to processor 120. Persons skilled in the art will appreciate that components may be placed between particular components and processor 120. For example, a display driver circuit may be coupled between display 140 and processor 120. Memory 143 may be coupled to processor 120. Memory 143 may include data that is unique to a particular card. For example, memory 143 may store discretionary data codes associated with buttons of a card (e.g., card 100 of FIG. 1). Such codes may be recognized by remote servers to effect particular actions. For example, a code may be stored on memory 143 that causes a promotion to be implemented by a remote server (e.g., a remote server coupled to a card issuer's website). Memory 143 may store types of promotions that a user may have downloaded to the device and selected on the device for use. Each promotion may be associated with a button. Or, for example, a user may scroll through a list of promotions on a display on the front of the card (e.g., using buttons to scroll through the list). A user may select the type of payment on card 100 via manual input interfaces corresponding to displayed options on display 125. Selected information may be communicated to a magnetic stripe reader via a dynamic magnetic stripe communications device. Selected information may also be communicated to a device (e.g., a mobile telephonic device) having a capacitive sensor or other type of touch sensitive sensor.

Card 100 may include, for example, any number of touch triggers 126 or light sensors 127. Touch triggers 126 may be utilized, for example, to activate and deactivate a touch sensor on a capacitive, or other, touch screen. In doing so, a device having a touch screen may believe that a user is physically providing physical instructions to the device when a card is actually providing physical instructions to the device. Light sensors 127 may be utilized such that a display screen, or other light emitting device, may communicate information to light sensors 127 via light.

Any number of reader communication devices may be included in architecture 150. For example, IC chip 152 may be included to communicate information to an IC chip reader. IC chip 152 may be, for example, an EMV chip. As per another example, RFID 151 may be included to communicate information to an RFID reader. A magnetic stripe communications device may also be included to communicate information to a magnetic stripe reader. Such a magnetic stripe communications device may provide electromagnetic signals to a magnetic stripe reader. Different electromagnetic signals may be communicated to a magnetic stripe reader to provide different tracks of data. For example, electromagnetic field generators 170, 180, and 185 may be included to communicate separate tracks of information to a magnetic stripe reader. Such electromagnetic field generators may include a coil wrapped around one or more materials (e.g., a soft-magnetic material and a non-magnetic material). Each electromagnetic field generator may communicate information serially to a receiver of a magnetic stripe reader for particular magnetic stripe track. Read-head detectors 171 and 172 may be utilized to sense the presence of a magnetic stripe reader (e.g., a read-head housing of a magnetic stripe reader). This sensed information may be communicated to processor 120 to cause processor 120 to communicate information serially from electromagnetic generators 170, 180, and 185 to magnetic stripe track receivers in a read-head housing of a magnetic stripe reader. Accordingly, a magnetic stripe communications device may change the information communicated to a magnetic stripe reader at any time. Processor 120 may, for example, communicate user-specific and card-specific information through RFID 151, IC chip 152, and electromagnetic generators 170, 180, and 185 to card readers coupled to remote information processing servers (e.g., purchase authorization servers). Driving circuitry 141 may be utilized by processor 120, for example, to control electromagnetic generators 170, 180, and 185.

Architecture 150 may also include, for example, touch transmitter 142 as well as light sensor 143. Architecture 150 may communicate information from touch transmitter 142 as well as receive information from light sensor 143. Processor 120 may communicate information through touch transmitter 142 and determine information received by light sensor 143. Processor 120 may store information on memory to later be, for example, communicated via touch transmitter 142.

Figure 2:
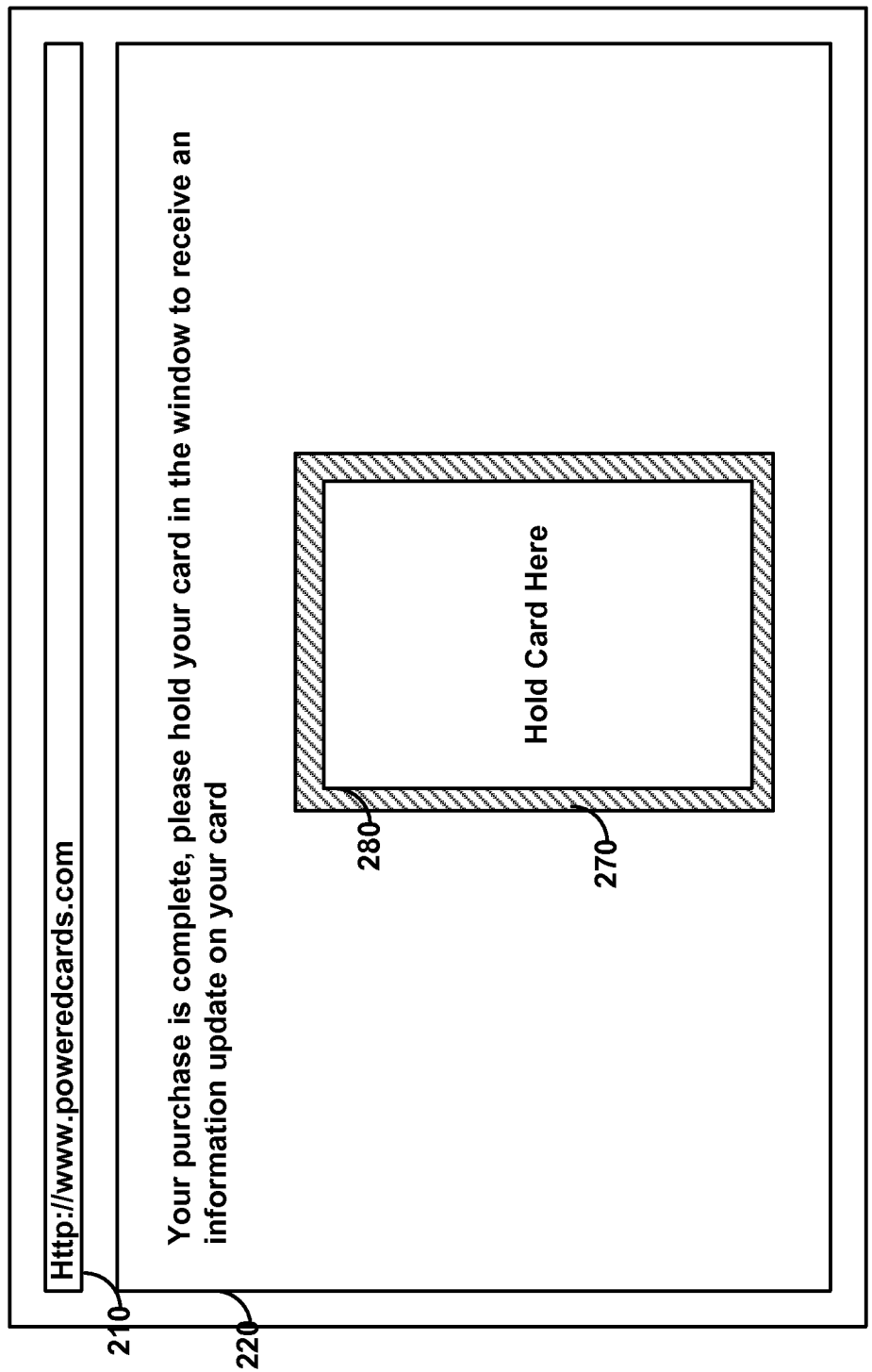
FIG. 2 is an illustration of a graphical user interface constructed in accordance with the principles of the present invention.

FIG. 2 shows graphical user interface (GUI) 200 that may be displayed, for example, from a stationary or portable computer, a mobile telephonic phone, a tablet computer, a navigational system, a watch, a card, or any device having a display screen. Graphical user interface 200 may be hosted from a server and may communicate with a number of additional servers. For example, graphical user interface 200 may be provided on a web browser, or other application run from a device, to complete a purchase transaction. GUI 200 may be provided upon the completion of a purchase to communicate update information back to a card. Such information may include, for example, an update points balance, credit balance, debit balance, pre-paid balance, or any other update information. Information may be communicated via light, for example, in light communication area 280. Status indication area 270 may be utilized to communicate information to a user while a card is held against a display. For example, status indication area 270 may change colors, or provide a different form of visual indicia, depending on if a update is starting, in the process of communication, or has completed communicating.

One or more light sensors or touch transmitters may be located on a card or other device. For example, a touch transmitter may be located at approximately opposite ends of a card as another touch transmitter. A light sensor may, for example, be located at approximately the opposite end of a card as a touch transmitter. A user may activate a button (e.g., a download button) to start communicating data via the touch transmitter. A button may be a physical button, a capacitive touch button, or any other type of button.

Figure 3:
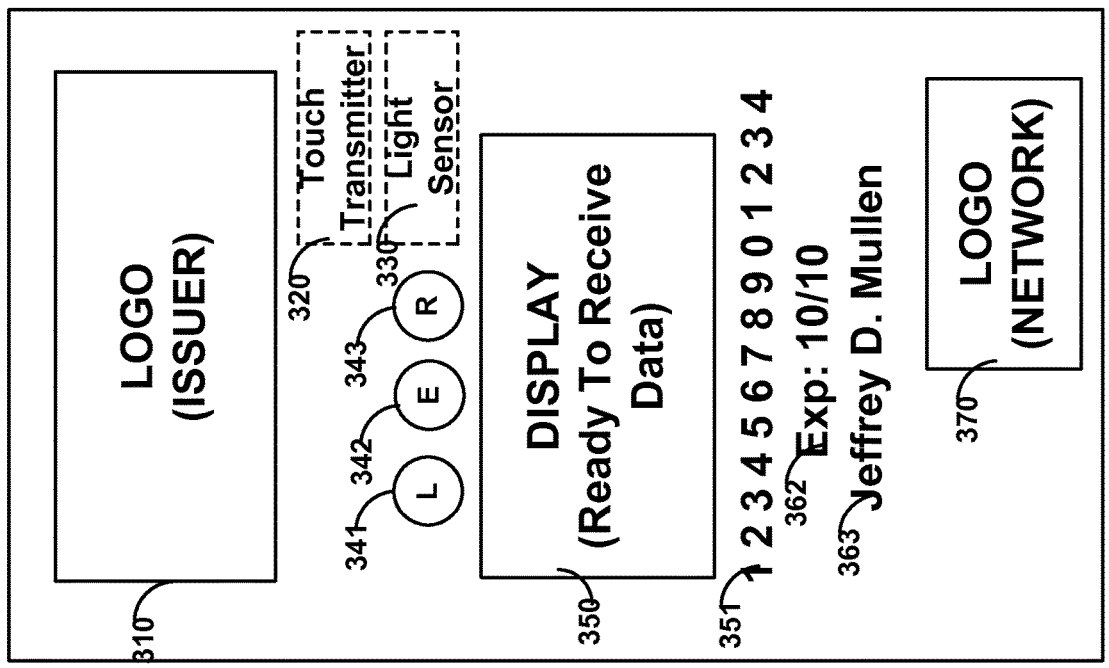
FIG. 3 is an illustration of a card constructed in accordance with the principles of the present invention.

FIG. 3 shows card 300, which may be provided in a vertical configuration. Card 300 may include, for example, issuer logo 310, network logo 370, display 350, manual input interfaces 341-343, touch transmitter 320, light sensor 330, permanent indicia 351, 362, and 363. Persons skilled in the art will appreciate that any permanent indicia may be provided via display 350. For example, one or more payment card numbers, user name, expiration date, and security codes may be provided via display 350.

Figure 4:
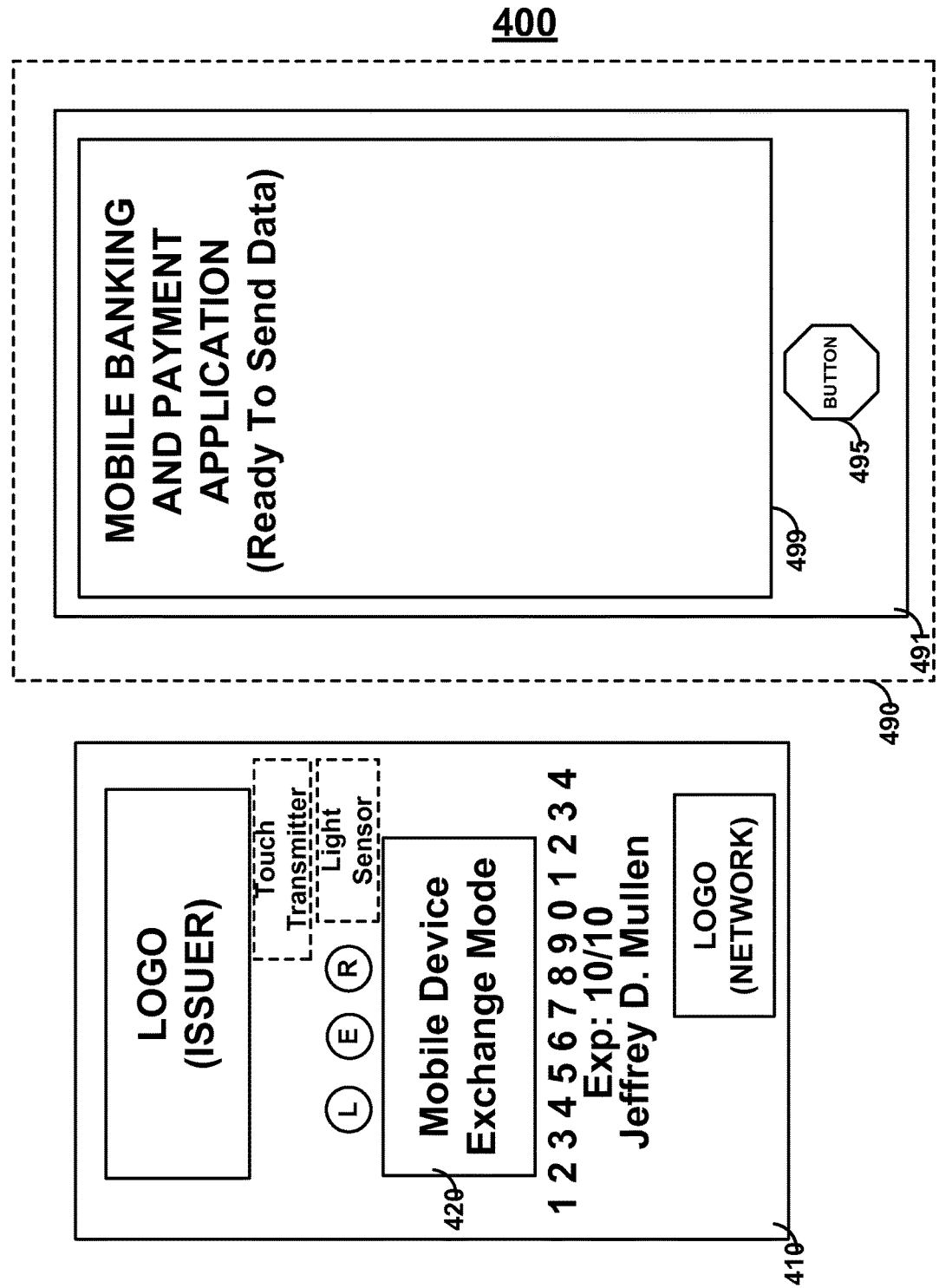
FIG. 4 is a schematic of a system constructed in accordance with the principles of the present invention.

FIG. 4 shows system 400 that may include mobile telephonic device 490 and device 410 (e.g., a payment card). Device 410 may include, for example, display 420 that may display status indicative of a communication. A touch transmitter and/or light sensor may be provided on a surface of device 410 opposite display 420. In this manner, for example, device 410 may communicate with mobile telephonic device 490 as device 410 is held against device 490, but device 410 may communicate information indicative of the status of a communication via display 420.

Device 490 may include housing 491, button 495, and capacitive touch display screen 499. Device 410 may utilize a touch transmitter to, for example, communicate information to mobile telephonic device 490. Persons skilled in the art will appreciate that a mobile banking application may be utilized on mobile telephonic device 490. Device 410 may be utilized to properly identify a person securely in order to reduce fraud. Accordingly, device 410 may communicate identification information and security codes, such as time based or used based codes, to device 490 via display 499. Accordingly, such an identification may be required, for example, by a banking application in order to gain access to banking information, execute a financial trade (e.g., a stock or option trade), transfer money, or pay a bill via an electronic check.

Persons skilled in the art will appreciate that multiple touch transmitters may communicate data simultaneously in parallel to a touch screen. Similarly, for example, multiple light sensors may receive data simultaneously in parallel from a display screen. The information may be, for example, different or the same. By communicating the same information through different touch transmitters, a device may receive two messages and confirm receipt of a communication if the two messages are the same. Touch transmitters may be utilized, for example, by software on a device to determine the positioning of a device on an associated touch screen. Similarly, light sensors may be utilized, for example, to receive information indicative of the positioning of a device on an associated touch screen.

Figure 5:
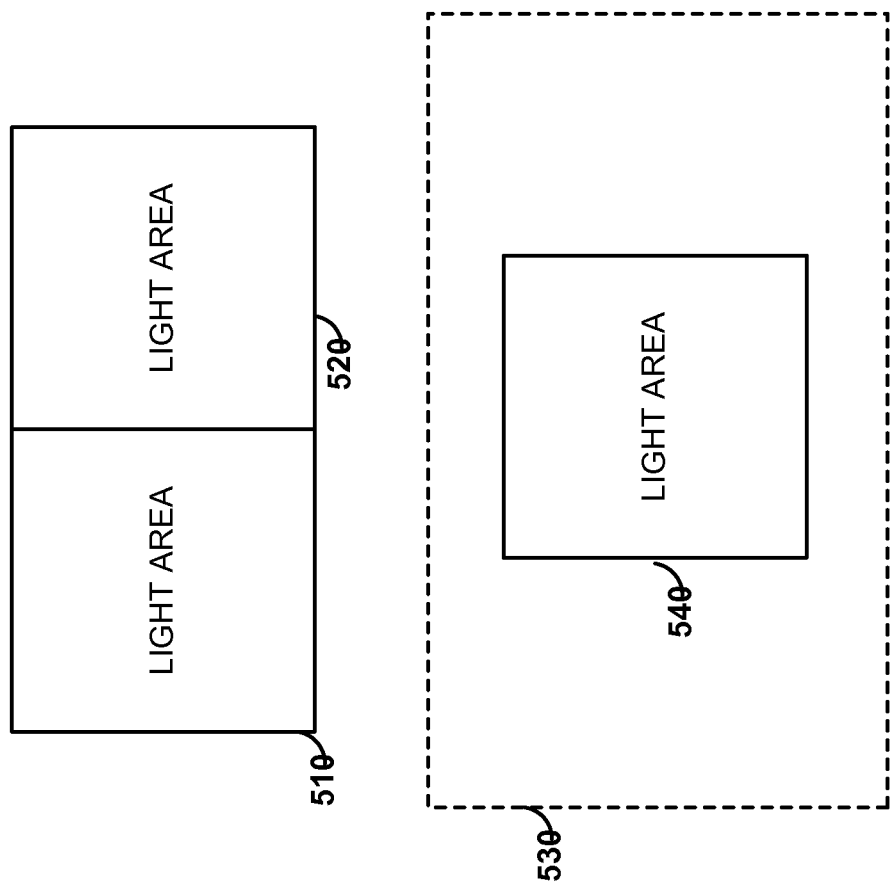
FIG. 5 is a schematic of a system constructed in accordance with the principles of the present invention.

FIG. 5 shows system 500 that may include a device having a display screen displaying light communication areas 510 and 520. Areas 510 and 520 may change color, for example, to communicate data. A card may include corresponding light sensors, or arrays of light sensors, in order to receive data from light areas 510 and 520. Data may be determined for example, based on the combination of colors provided in the light regions. For example, a particular combination of colors may be associated with a particular data (e.g., a particular bit) and a different combination of colors may be associated with a different data (e.g., a different bit). A combination of colors may be utilized as a transition. Such a transition combination may be utilized, for example, to indicate to a card, or other device, the separation of data. For example, two regions may be provided. Both regions being determined to be black may be associated with a transition. One region being white while the other is black may be determined to be associated with one bit of information. One region being black while the other is white may be determined to be associated with a different bit of information. Both regions being white may be utilized to convey the beginning and/or ending of a message. A two color scheme may be utilized. More than two colors may be utilized. Furthermore, for example, a card, or other device, may be able to receive information regardless of the colors used. For example, information may be discerned based on the colors being different. As such, both colors being the same may be utilized as one bit of information while both colors being different may be utilized as a different bit of information. In doing so, for example, the same communication encoding method may be utilized regardless of the type of display utilized (e.g., a several color display or a black/white or a green/yellow display). A clock may be utilized to determine timing information. Such a clock may be a clock internal to a processor. Such a clock may alternatively be a clock separate from the processor.

A processor may be configured, for example, to operate in the range of approximately 1 megahertz to 30 megahertz (e.g., approximately 2-5 megahertz). A battery may be utilized to power the card or other device. A payment card (e.g., a debit, credit, pre-paid, and/or gift card) may be provided to a customer (e.g., mailed to a customer) with a battery charged between 3 and 4.5 volts (e.g., between approximately 3.2 and 4.2 volts). An electronics package may be laminated into a card after a battery is charged. For example, an electronics package may be laminated into a card via a hot or cold lamination process. An electronics package may be laminated into a card via an injection molding process utilizing one or more liquid laminates that are hardened via a light, temperature, pressure, time-based, chemical, or other reaction.

System 530 may be included and may include a device having a display that displays light communication area 540. Light communication area 540 may communicate information via light pulses. Such light pulses may communicate data serially. Persons skilled in the art will appreciate that a single light area and a single, or an array of light sensors, for that single area may be utilized on a device regardless of screen size. A user may place a card's light sensor, or array of light sensors, against area 540 and may receive data from area 540 as light is pulsed to the card. Information may be communicated, for example, via frequency double-frequency encoding. For example, transitions may be determined by a processor and the periods of time between these transitions may be utilized as data. For example, a "short" interval may be discerned as one type of bit of data (e.g., a "0") while a "long" interval may be discerned as a different type of bit of data (e.g., a "1"). A transition may be determined, for example, as the change of one color to another color (e.g., black to white and white to black) or from one particular color to another particular color (e.g., black to white but not white to black).

Any type of device with a display may be utilized to communicate information from a card, or other device, via light. For example, a television, mobile telephonic phone, personal computer (e.g., stationary, portable laptop, or portable tablet computer), automated-teller-machine device, electronic register device, or any other type of electronic device. Information may be communicated via light regions provided in webpages, software applications, television streams (e.g., during a commercial or a television show), or any other display screen or user interface.

Figure 6:
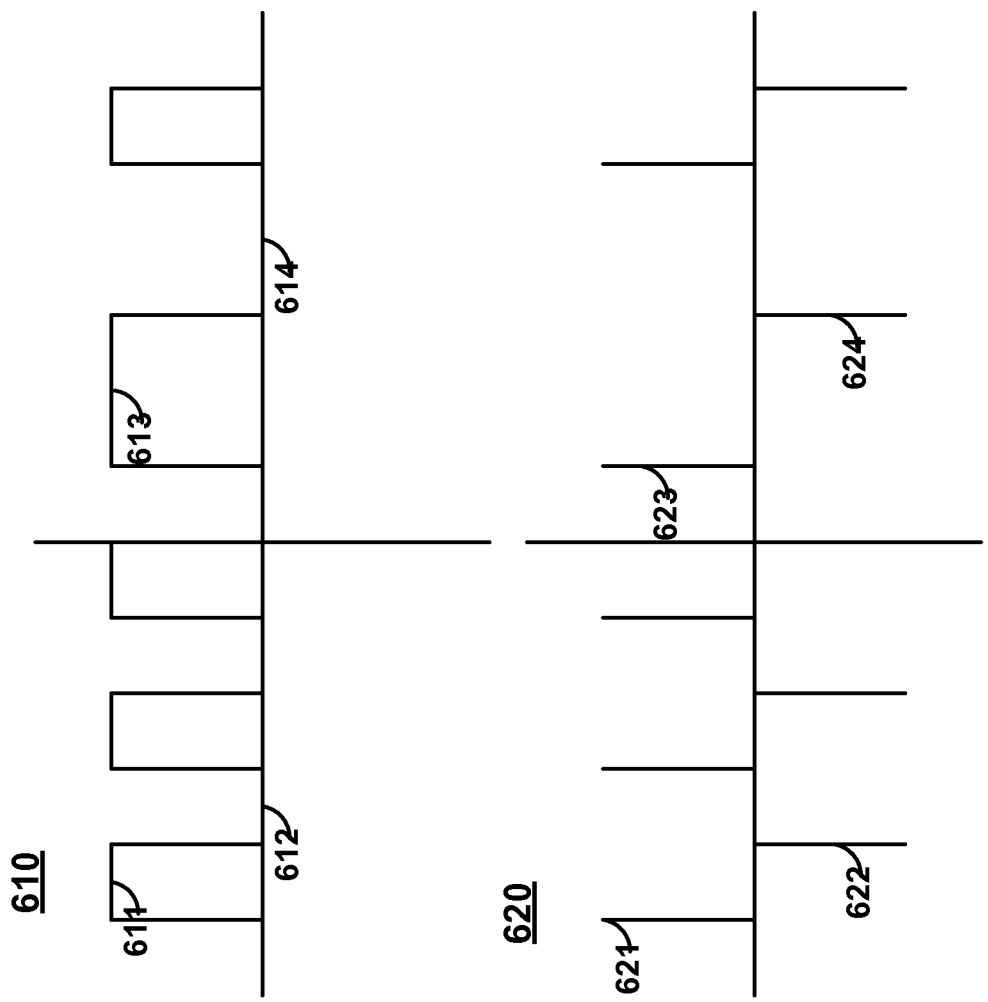
FIG. 6 is an illustration of signals constructed in accordance with the principles of the present invention.

FIG. 6 shows signal 610 and signal 620. Signals 610 and 620 may be communicated, for example, from a single light area on a display to a single light sensor on a card, or other device. Signal 610 may communicate information via the length of a pulse of a particular color (e.g., white) with a baseline width of a different color (e.g., black) (e.g., pulses 611 and 612). Signal 610 may, alternatively, communicate information with long durations and short durations of two colors. For example, a short duration of white followed by a short duration of black may be one bit while a long duration of white followed by a long duration of black may be another bit (e.g., pulses 613 and 614). Signal 620 may, for example, communicate information via the time durations between transitions from one state (e.g., white) to another color state (e.g., black). Short durations may be one bit (e.g., "0") while long durations may be another bit (e.g., "1"). In doing so, for example, frequency double-frequency encoding may be realized (e.g., via pulses 621-624).

Figure 7:
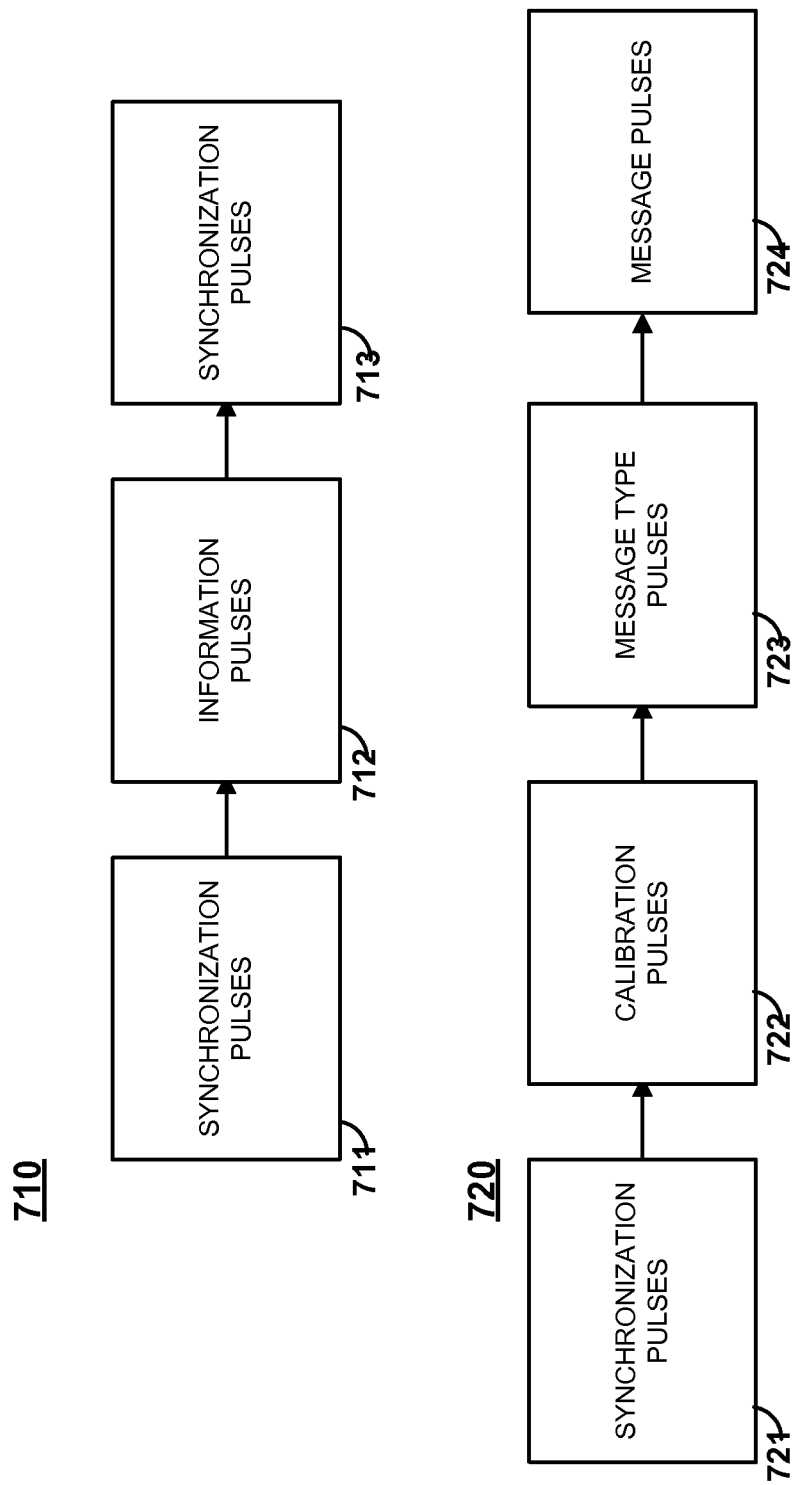
FIG. 7 is an illustration of signals constructed in accordance with the principles of the present invention.

FIG. 7 shows data streams 710 and 720. Data stream 710 may include synchronization pulses 711, information pulses 712, and synchronization pulses 713. Persons skilled in the art will appreciate that synchronization pulses may be provided as a string of a particular bit (e.g., a string of "0"s). In doing so, for example, a card may determine the duration of transition changes associated with that bit such that information may be properly discerned by the card. In this manner, information may be communicated, via light, regardless of the frame rate of the display screen communicating the information. Stream 720 may include synchronization pulses 721, calibration pulses 722, message type pulses 723, and message pulses 724. Message type pulse may identify the type of data included in the subsequent message pulse. In doing so, for example, the message pulse may be properly identified and routed for processing. Calibration pulses 722 may be utilized by a card, for example, to discern more information about the capabilities of a display, how colors are displayed, backlighting attributes, and/or ambient light and optical noise. Persons skilled in the art will appreciate that calibration pulses may also be synchronization pulses and synchronization pulses may have different, particular attributes (e.g., brightness or depth of color) such that calibration may occur more efficiently and effectively. Persons skilled in the art will also appreciate that black and white pulses may be utilized on both several color displays and black and white displays.

Numerous applications may be realized utilizing, for example, light pulses to communicate light to a card or between cards (or other devices). For example, a card may receive information via light indicative of a payment card number (e.g., a credit, debit, pre-paid, and/or gift card number). In doing so, a payment card number may be remotely issued to a card via, for example, a mobile device or a portable computer. A payment card number may be remotely issued, for example, via a web browser when, for example, a payment card number is compromised or a new product is desired to be added to a card (e.g., a new credit, debit, or pre-paid product). Alerts may be communicated via light and received by a card. An alert may instruct a card to provide a particular visible alert (e.g., a light blinking or particular indicia to be provided on a display) upon receipt, at a particular time, or a particular frequency. Such an alert, for example, may be indicative of a new promotion that is awaiting a user. Promotions, coupons, and advertisements may also be downloaded to a card via light. Games may be played on a card and game information may be communicated via light. For example, a casino loyalty card may receive a particular code via light and this code may correspond to a game loss or a game win of a particular amount. The code may be utilized by a game on the card (e.g., to roll dice on a display or spin a slot machine on a display). Features may be added or switched on a card. For example, a user may add a feature enabling the user to pay for a purchase with points, in installments, via a deferred pay, debit pay, prepaid pay, or credit pay. Such features may be switched, for example, on the back-end such that information may not be required to be communicated to the card. For example, a user may go online and switch the feature utilized upon the selection of a particular button on the card. In communicating the information via light, however, the card may utilize the information to provide a more functional card. For example, a display located next to a button may change the information displayed to be indicative of a new feature such that a user does not have to remember the features associated with particular buttons. Information on a card may be updated. For example, a user profile (e.g., reward mile status) may be updated via light pulses. Software on a card may be updated via light pulses. A user may utilize a particular code to unlock a card by entering this code into buttons. The code may be changed via light pulses. Similarly a card may become locked until a code is entered into the card that the user is not aware of. This code may be communicated to a card via light pulses to unlock the card. Timing information may be communicated to a card (e.g., the date and time of transmission) such that a card may update and resynchronize an internal clock. Value may be added, and stored, on a card via light information. For example, pre-paid or gift amounts may be added to a card. A card may receive a hotel key via light, for example, when a user pays for a hotel room. An online check-in feature may be provided via a hotel reservation center such that the hotel may download the room key directly to the card. In doing so, a user may simply go directly to his/her room when the user reaches the hotel. Frequent flier status and/or miles may be communicated via light. Insurance information, medical records, or other medical information may be communicated to a card via light. Transit information such as subway value/tokens, train value/tokens, ferry value/tokens may be added to a card via light or other wireless communication into a card. A transit number (e.g., a monthly pass number) may be added to a card via light (e.g., or sound). Person-to-person payments may be made via two cards (e.g., via light sensors and sources of light on the cards). Advertisements may be communicated to a card via light. Light may be communicated, for example, via a single color of light.

For example, a light source (e.g., an LED) of a card, or other device, may communicate information to another card, or device, by turning that light source ON and OFF in a pattern recognizable by the other device. A device may be operable to receive information using different schemes of light communication. A processor of a device receiving a particular scheme may utilize knowledge of each scheme to determine the scheme being utilized. In doing so, the processor may determine, for example, the type of device sending the communications. In this manner, for example, a card may be able to discern when the card is receiving information from a card or a non-card device. Different types of devices may have different types of handshakes and security. As such, for example, different types of applications (e.g., payment applications) may be utilized by the device based on the level of security of the communication.

A card, or other device, may be programmed with application code before the electronics package is laminated into a card. The card, or other device, may receive payment card information (e.g., a credit, debit, pre-paid, and/or gift card number) after the electronics package is laminated into a card. In doing so, for example, different facilities may be utilized to laminate and personalize the cards.

Figure 8:
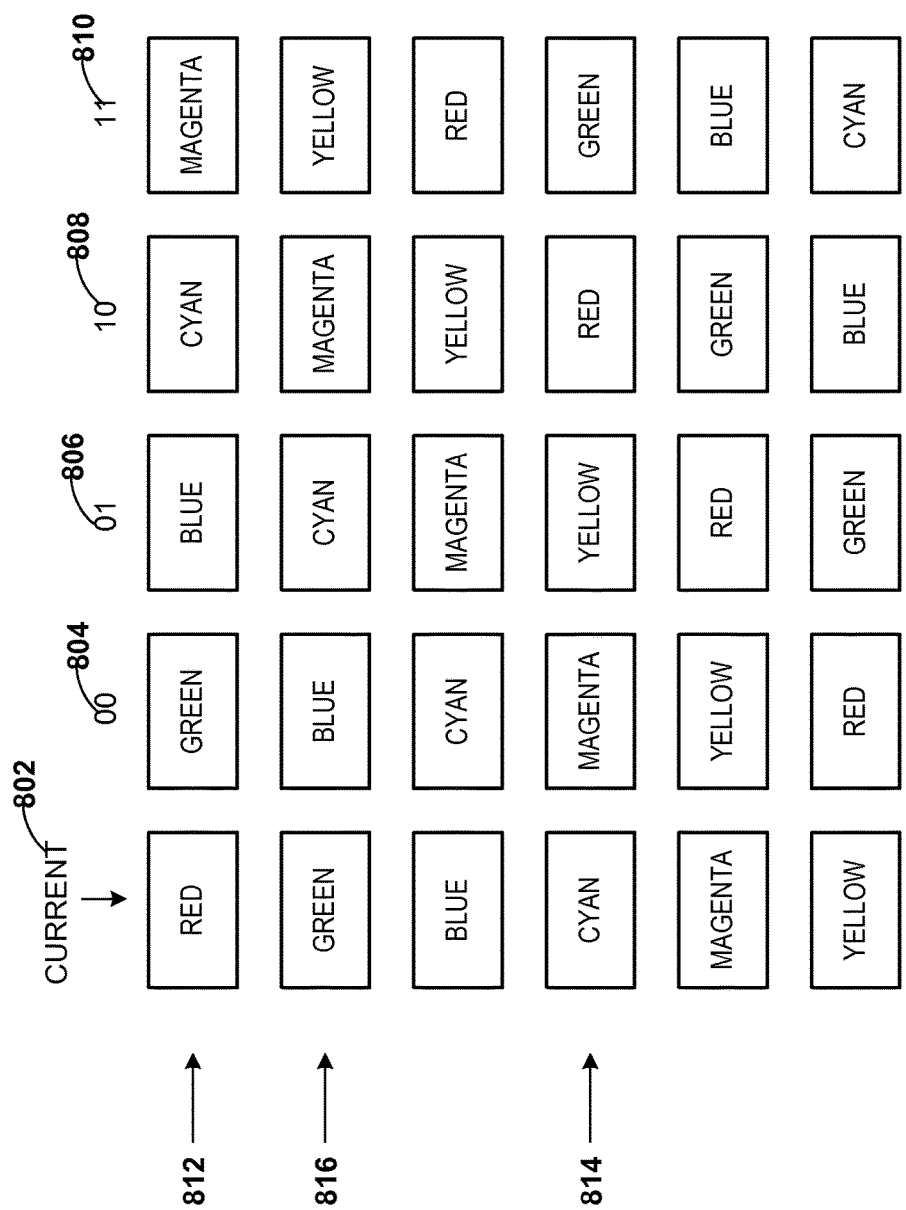
FIG. 8 is an illustration of a scheme constructed in accordance with the principles of the present invention.

FIG. 8 shows color encoding scheme 800. Color encoding scheme 800 may, for example, be implemented by a light source capable of generating multiple colors of light. A light sensor may, for example, detect each color of light generated by such a light source and may, for example, discern information communicated based upon the color of light detected. Accordingly, for example, each color of light may exhibit a characteristic (e.g., wavelength) that may be detected by a light sensor and communicated to a processor. In so doing, data may be communicated from a light source to a processor using changes in light characteristics (e.g., changes in the color and/or intensity of light generated).

A data sequence may be associated with a color and/or a color transition, such that a number of data bits (e.g., two data bits) may be communicated based upon the particular color and/or color transition generated. Accordingly, for example, data sequences may be encoded based upon a color of light that may be initially generated by a light source and a color of light that may be generated subsequent to the initially generated color of light.

Color encoding scheme 800 illustrates multiple colors (e.g., six colors) that may be generated by a light source. Other colors (e.g., black and white) may also be generated by the light source. Each color and/or color transition may, for example, be encoded with a bit sequence, such that a light sensor and associated processor that detects each color and/or each color transition may decode the detected color and/or color transition into its associated data sequence. Accordingly, for example, multiple data bits (e.g., four bits of data) may be communicated by generating a first frame of light having a first color followed by generating a second frame of light having a second color in accordance with color encoding scheme 800. In so doing, for example, four bits of data may be communicated by generating two colors of light in two adjacent frames.

Any data sequence may, for example, be communicated by a light source by first generating a start sequence (e.g., generating a black pulse followed by a white pulse or generating a white pulse followed by a black pulse). The next color generated by the light source may represent the first two data bits communicated by the light source as illustrated, for example, by columns 804-810 of row 812. Accordingly, for example, a light source may communicate data sequence 804 (e.g., "00") if the color "green" is generated after a start sequence, a light source may communicate data sequence 806 (e.g., "01") if the color "blue" is generated after a start sequence, a light source may communicate data sequence 808 (e.g., "10") if the color "cyan" is generated after a start sequence, and a light source may communicate data sequence 810 (e.g., "11") if the color "magenta" is generated after a start sequence.

Subsequent data bits may be communicated, for example, based upon a color transition exhibited by a light source in accordance with color encoding scheme 800. Accordingly, for example, column 802 may illustrate a current color being generated by a light source and based upon a color transition from one of the colors in column 802 to a subsequent color, the next data bits (e.g., the next two data bits) may be encoded. As per an example, the color "cyan" may be generated by a light source subsequent to a start sequence, which may be encoded as data sequence 808 (e.g., "10") from row 812. A subsequent color transition from "cyan" to "green" may be encoded as data sequence 810 (e.g., "11") as indicated by row 814. A subsequent color transition from "green" to "yellow" may be encoded as data sequence 810 (e.g., "11") as indicated by row 816. In so doing, for example, each color transition from a current color to a subsequent color may be encoded as multiple data bits (e.g., two data bits), such that two data bits may be encoded for each color change.

Rather than using color, light intensities may be used. Accordingly, for example, color encoding scheme 800 may be replaced with a light intensity encoding scheme, whereby light intensities instead of color may be used to encode data. In so doing, for example, a single color (e.g., "red") may be used as a carrier, where a brightness of the carrier may be used to encode the carrier with actual data. In so doing, multiple light intensities (e.g., six different brightness levels) may be used to encode data. Persons skilled in the art will appreciate that a larger variety of colors (or intensities) may yield a larger number of data bits that may be encoded per frame of light generated by the light source. Persons skilled in the art will further appreciate that variances in data communication rates between a light source and a light sensor may be tolerated since color transitions (or intensity transitions) may be used to indicate data boundaries. In addition, a degree of error correction may be implemented by color encoding scheme 800 (or an intensity encoding scheme) since not all color transitions (or intensity transitions) may be valid.

Figure 9:
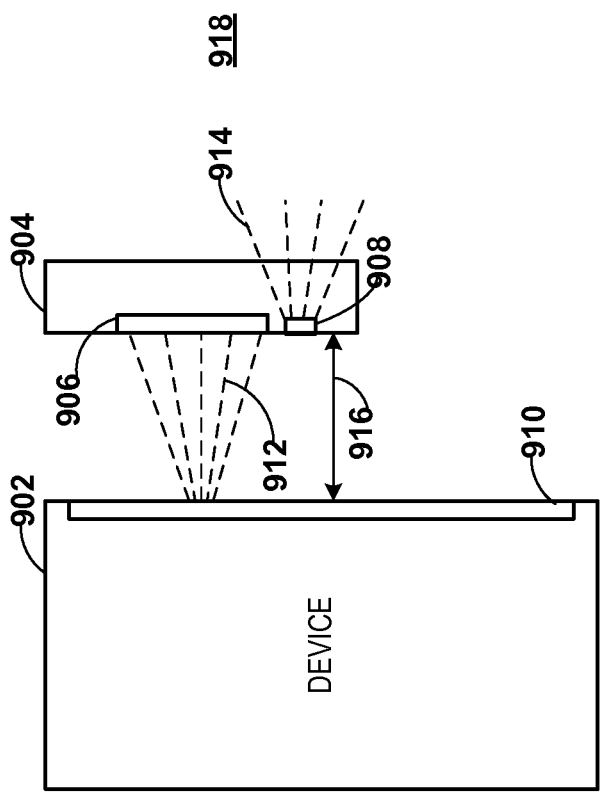
FIG. 9 is an illustration of a system constructed in accordance with the principles of the present invention.

FIG. 9 shows system 900, which may include device 902 having display 910, card (or other device) 904 having light sensor 906 and status indicator 908. Device 902 may, for example, include display 910 that may generate light (e.g., pulses of light 912) from any portion of display 910. Light sensor 906 may, for example, be operative to detect light (e.g., pulses of light 912) as generated by display 910. Status indicator 908 (e.g., an LED) may, for example, generate status information concerning data communicated via light pulses 912. Accordingly, for example, a processor of card 904 may determine whether light pulses 912 are being detected and further may decode light pulses 912 as data communicated by device 902 to card 904. In so doing, for example, a status of a detection of light pulses 912 and/or a status of decoding light pulses 912 into communicated data may be generated by a processor and indicated by status indicator 908 (e.g., LED 908 may generate green light 914 if data communication and data decoding is successful). Status indicator 908 (e.g., an LED) may, for example, be provided as a back-facing LED, such that communication status may be indicated on side 918 of card 904 (e.g., through card 904) while data communication between card 904 and device 902 may be conducted on an opposite side of card 904.

Light sensor 906 (and other electronic components) may, for example, be electrically and/or mechanically bonded to a printed circuit board of card 904 to form an electronic assembly. Such an electronic assembly may be encapsulated by an injection molding process (e.g., an injection molding process based on a reaction of two materials or one material). For example, a silicon-based material or a polyurethane-based material may be injected and cured (e.g., using a temperature, light, pressure, time-based, and/or chemical reaction) to form the electronics package. The electronics package (and other components of card 904) may be sandwiched between layers of laminate (e.g., layers of polymer laminate), such that both surfaces of card 904 may be formed by a layer of laminate. An injection process may inject material between such layers of polymer. An injection process may, for example, place an electronics package on one layer of polymer, inject one or more injection laminate materials over the electronics package, and then place a different layer of polymer over the electronics package covered in one or more liquid injection laminates. A reaction may then occur to harden the structure into a card.

The electronics package may be formed via a lamination process into other structures such as, for example, a mobile telephonic device, portable tablet computer, portable laptop computer, watch, any other type of electronic device, or any part of any electronic device. Light sensor 906 may, for example, be sensitive to light pulses 912 even when light sensor 906 is buried below one or more layers of laminate material. A card may be printed with indicia. Areas that may block light to a light sensor may be printed, for example, with lighter colors. Alternatively, no printing ink/material may be placed above a light sensor such that the light sensor may receive light unimpeded by print ink/material. One or more light sensors may be provided on one side of a card while one or more touch transmitters may be provided on the opposite side of a card. One or more light sensors may be provided on the same side of a card as one or more touch transmitters. One or more sources of light may be placed on the same or different sides as one or more light sensors. In placing a light sensor on a different side as a light source, a user may hold the light sensor side of the card to a display and receive a visual indication via one or more light sensors (or displays) on the back of the card that an action has occurred (e.g., a communication has not yet begun, a communication has begun, a communication is in progress, a communication is complete, a communication has failed, a communication was correctly completed).

Light sensor 906 may, for example, be sensitive to a wide frequency range of signals. For example, device 902 may refresh display 910 at a particular rate (e.g., 50 or 60 Hz) such that refresh rate noise may be detected by light sensor 906. As per another example, display 910 may provide back lighting that may be controlled (e.g., pulse width modulated) at another frequency rate (e.g., hundreds of Hz to thousands of Hz) such that back-lighting control noise may be detected by light sensor 906. As per yet another example, a scrolling refresh rate may be exhibited by display 910, whereby pixels of display 910 may be refreshed in a left-to-right, top-to-bottom sequence, thereby affecting a color or intensity of light pulses 912. Accordingly, for example, a processor of card 904 may execute an application (e.g., a digital signal processing application) that may be used to cancel (e.g., filter out) such noise effects. Light sensor 906 may detect light pulses 912 at a varying distance 916. For example, display 910 may generate light pulses having a high intensity, such that distance 916 may be maximized (e.g., card 904 may be held further away from display 910 to detect light pulses 912 having a relatively high intensity). Alternately, for example, display 910 may generate light pulses having a low intensity, such that distance 916 may be minimized (e.g., card 904 may be held closer to display 910 to detect light pulses 912 having a relatively low intensity). Ambient light (e.g., light not generated by display 910) may also decrease distance 916 (e.g., card 904 may need to be held closer to display 910 in the presence of ambient light) to allow detection of light pulses 912.

A user may, for example, utilize status indicator 908 to determine whether distance 916 is adequate to support reliable data communication between device 902 and card 904. Accordingly, for example, if distance 916 is too large to support reliable data communication, status indicator 908 (e.g., an LED) may indicate such a status (e.g., illuminate red light). Alternately, for example, if distance 916 is adequate to support reliable data communication, status indicator 908 (e.g., an LED) may indicate such a status (e.g., illuminate green light). In so doing, for example, a user of card 904 may obtain communication status from status indicator 908, so that the user may bring card 904 within an acceptable communication distance 916 of device 902.

A processor may determine a color by receiving one or more samples of light within a particular range of wavelengths. Multiple samples may be averaged together during a sampling interval to determine an average wavelength or other characteristic (e.g., intensity) and this average characteristic over a period of time, may be utilized for determination calculations. A particular number of samples may be taken (e.g., two, three, four, or more than four) and averaged together and the average of these samples may be utilized by a processor to make determinations.

Figure 10:
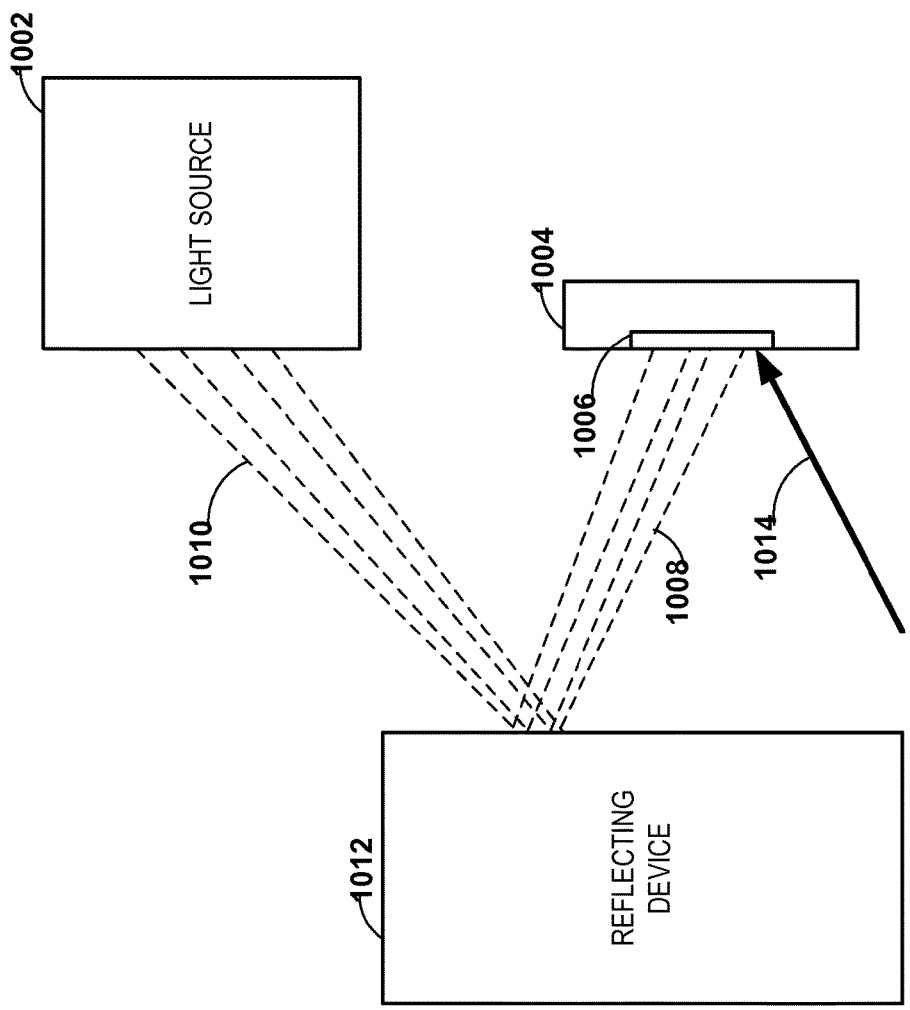
FIG. 10 is an illustration of a system constructed in accordance with the principles of the present invention.

FIG. 10 shows system 1000, which may include light source 1002, card (or other device) 1004 having light sensor 1006, and reflecting device 1012. Light source 1002 may, for example, provide light pulses 1010 that may be detected by light sensor 1006 as reflected light pulses 1008. Accordingly, for example, light sensor 1006 of card 1004 may receive communicated data from devices that may use a projection medium (e.g., a projection TV). Other light sources may, for example, generate ambient light 1014 that may be detected by light sensor 1006. Accordingly, for example, a processor of card 1004 may use filtering (e.g., a digital signal processing algorithm) to cancel the effects of ambient light 1014 so that data encoded within light pulses 1008 may be more accurately detected and decoded by the processor.

Persons skilled in the art will also appreciate that the present invention is not limited to only the embodiments described. Instead, the present invention more generally involves dynamic information. Persons skilled in the art will also appreciate that the apparatus of the present invention may be implemented in other ways then those described herein. All such modifications are within the scope of the present invention, which is limited only by the claims that follow.

What is claimed is:

1. A card comprising:
a processor;
memory; and
a light sensor operable to receive light signals,
wherein said processor is operable to decode frequency double-frequency (F2F) encoded light signals and store said decoded information in memory.

2. The card of claim 1, wherein said light sensor is operable to detect multiple colors of said received light signals.

3. The card of claim 1, wherein said light sensor is operable to detect multiple colors of said received light signals, and
said processor is operable to decode said detected multiple colors into said decoded information.

4. The card of claim 1, wherein said light sensor is operable to detect color transitions between said received light signals.

5. The card of claim 1, wherein said light sensor is operable to detect color transitions between said received light signals, and
said processor is operable to decode said detected color transitions into said decoded information.

6. The card of claim 1, wherein said light sensor is operable to detect multiple intensities of said received light signals.

7. The card of claim 1, wherein said light sensor is operable to detect multiple intensities of said received light signals, and
said processor is operable to decode said detected multiple intensities into said decoded information.

8. A system comprising:
a card including a first light sensor and a processor; and
a device operable to generate light signals,
wherein said card is operable to receive information from said device via said light signals detected by said first light sensor, and
said processor is operable to decode said information regardless of a frequency of said light signals.

9. The system of claim 8, wherein said processor is operable to decode said information from a duration of said detected light signals.

10. The system of claim 8, wherein said processor is operable to decode said information from a duration between said detected light signals.

11. The system of claim 8, wherein said processor is operable to decode said information from a color of said detected light signals.

12. The system of claim 8, wherein said processor is operable to decode said information from an intensity of said detected light signals.

13. The system of claim 8, wherein said card further comprises a second light sensor, wherein said card is operable to receive information from said device via said light signals detected by said first and second light sensors.

14. A method comprising:
generating pulses of light from a device;
detecting said pulses of light with a card; and
decoding, by a processor, said detected pulses of light as information communicated from said device to said card regardless of a frequency of said light signals.

15. The method of claim 14, wherein a light sensor of said card detects a duration of said pulses of light, and
said processor of said card decodes said detected duration into said information.

16. The method of claim 14, wherein a light sensor of said card detects a duration between said pulses of light and said processor of said card decodes said detected duration into said information.

17. The method of claim 14, wherein a light sensor of said card detects a color of said pulses of light and said processor of said card decodes said detected color into said information.

18. The method of claim 14, wherein a light sensor of said card detects a color transition between said pulses of light and said processor of said card decodes said detected color transition into said information.

19. The method of claim 14, wherein a light sensor of said card detects an intensity of said pulses of light and said processor of said card decodes said detected intensity into said information.

20. The method of claim 14, wherein first and second light sensors of said card detects said pulses of light and said processor of said card decodes said detected pulses of light into said information.

* * * * *